United States Patent
Scherenberg

[11] 3,710,315
[45] Jan. 9, 1973

[54] STOP-LIGHT FOR MOTOR VEHICLES
[75] Inventor: Hans O. Scherenberg, Stuttgart-Heumaden, Germany
[73] Assignee: Daimler-Benz Aktiengesellschaft, Stuttgart-Unterturkheim, Germany
[22] Filed: March 18, 1969
[21] Appl. No.: 808,080

[30] Foreign Application Priority Data
March 18, 1968 Austria..............................A 2645/68

[52] U.S. Cl.................................340/62, 340/71
[51] Int. Cl. ................................B60q 1/44
[58] Field of Search.........340/62, 66, 69, 71, 72, 74, 340/82, 60, 81, 420, 262–264, 266, 335

[56] References Cited

UNITED STATES PATENTS

| | | | |
|---|---|---|---|
| 2,090,332 | 8/1937 | O'Neil | 315/79 |
| 2,091,086 | 8/1937 | Taylor | 340/71 UX |
| 2,128,841 | 8/1938 | Moore et al. | 340/62 UX |
| 2,572,144 | 10/1951 | Healy | 340/71 X |
| 2,794,082 | 5/1957 | Germaine | 340/72 X |
| 2,946,042 | 7/1960 | Beasley | 340/69 |
| 3,019,415 | 1/1962 | Marion | 340/82 |
| 3,320,586 | 5/1967 | Wagner | 340/66 |
| 3,364,384 | 1/1968 | Dankert | 340/66 X |
| 3,431,556 | 3/1969 | Johnson | 340/72 |
| 3,461,424 | 8/1969 | Kayuha | 340/72 X |
| 3,492,638 | 1/1970 | Lane | 340/66 |
| 2,250,587 | 7/1941 | Larson | 340/66 X |
| 2,446,870 | 8/1948 | Davis | 340/263 |
| 2,446,871 | 8/1948 | Davis | 340/263 |
| 2,685,048 | 7/1954 | Schweitzer | 340/62 X |
| 3,324,454 | 6/1967 | Haratani | 340/71 |
| 3,375,496 | 3/1968 | Antunovic | 340/66 X |
| 3,395,388 | 7/1968 | Hendrickson | 340/71 |
| 1,201,564 | 10/1916 | Daniel | 340/264 |
| 1,356,097 | 10/1920 | Taylor | 340/264 UX |
| 2,832,864 | 4/1958 | Rapp | 340/66 X |
| 3,281,786 | 10/1966 | Leichsenring | 340/66 |
| 3,528,056 | 9/1970 | Voevodsky | 340/72 |

FOREIGN PATENTS OR APPLICATIONS

| | | | |
|---|---|---|---|
| 813,114 | 9/1951 | Germany | 340/62 |
| 696,489 | 9/1940 | Germany | 340/263 |

OTHER PUBLICATIONS

German printed application 1,234,553, 2–1967, Mossbauer.

Primary Examiner—Kenneth N. Leimer
Attorney—Craig and Antonelli

[57] ABSTRACT

A stop-light system for motor vehicles for providing a variable light indication to the operator of a trailing vehicle including means responsive to the driving velocity and applied brake pressure for controlling the energization of the stop-lights to provide a variable light indication which varies from a weak to a strong indication with decreasing driving velocity and/or increasing brake pressure. The variable light indication is in the form of an increase in the lighted-up surface and/or an increase in the intensity of the stop-lights.

24 Claims, 4 Drawing Figures

INVENTOR
HANS O. SCHERENBERG

STOP-LIGHT FOR MOTOR VEHICLES

The present invention relates to a stop-light for motor vehicles with changing light indication.

Stop-lights of this type have the purpose to render braking operations particularly clearly recognizable and especially the intensity thereof in order to eliminate in this manner as much as possible rear-end collisions. The same problems are also to be solved by stop-lights which light up in the heretofore customary manner during a braking operation independently of the intensity thereof and which are additionally so connected that in the interest of a pre-warning, they already light up when the drive or gas pedal in the vehicle is taken back into its starting position.

The known stop-lights are not completely satisfactory insofar as they do not give a clear indication conerning the magnitude of the existing collision danger to the driver driving to the rear of the vehicle in question. Thus, a relatively weak braking at a small velocity may cause the vehicle to come to a stop within only a few meters (i.e. greatest danger for the driver to the rear of the vehicle in question) whereas the same weak braking at high velocity has initially quite a weak effect and will hardly cause a rear end collision.

The present invention aims at avoiding the aforementioned disadvantages of the known stop-lights in that an indication is given which expresses better the degree of potential danger than heretofore. The solution to the underlying problems essentially resides according to the present invention in that switch means are provided which change the light indication with a decreasing velocity in the sense of a more intensive warning, i.e., for example, by an increase of the lighted-up surface and/or of the light intensity.

A particularly meaningful and effective warning is achieved by the present invention because the driver of a trailing vehicle can read or determine from the type of the lighting-up of the stop-light, which may be either step-wise or continuous, what brake path is to be reckoned with at the leading vehicle so that timely measures can be taken in order to avoid a rear end collision.

In realization of the inventive concept, with a stop-light having a varying light indication with increasing brake pressure, for example, with a change of the lighting-up surface and/or of the light intensity, there may be provided switch means which vary the light indication with a decreasing velocity in the same sense as with increasing brake pressure.

The stop-light may be turned on already in the position of the drive or gas pedal corresponding to the starting position, i.e., in the idling position. A type of pre-warning is achieved by this measure prior to the beginning of the braking operation, which makes recognizable from what driving velocity a subsequently carried-out brake operation is actually carried out. An indication for the brake path to be expected is again given thereby, which can then be determined more accurately from the increase of the lighted-up area of the stop-light and/or the light intensity thereof. The driver of a trailing vehicle can thus react correspondingly early and can take all the measures which preclude a read-end collision.

With a stop-light having a change of the lighted-up surface and/or of the light intensity, the arrangement may be made in a structurally advantageous manner but also for the purpose of a sufficient indication of the prevailing driving velocity and of the brake path to be expected in such a manner that with a decreasing velocity, the increase of the magnitude of the lighting-up surface and/or of the light intensity takes place step-wise. It also suffices if according to a further feature of the present invention, the switch means are so constructed that with increasing brake pressure, the increase of the lighting-up surface and/or of the light intensity takes place step-wise.

With such a step-wise change of the magnitude of the lighting-up surface and/or of the light intensity, the brake pressure necessary for switching from a pre-determined lighted-up surface or an intensity step to the next higher step can depend linearly on the driving velocity.

In order that no lighting-up of the stop-light takes place in a motor vehicle with a clutch and a manually shifted transmission in the drive connection, if for the purposes of changing a transmission speed or ratio the gas pedal is taken back to the initial or starting position, a switch may be provided which upon actuation of the clutch, interrupts the current supply to the stop light.

Accordingly, it is an object of the present invention to provide a stop-light system for motor vehicles which avoids by simple means the aforementioned shortcomings and drawbacks encountered in the prior art.

Another object of the present invention resides in a stop-light for motor vehicles which provides a clear indication concerning the magnitude of the prevailing rear end collision danger.

A further object of the present invention resides in a stop-light system for motor vehicles which clearly expresses the degree of the potential danger by an increase in the intensity of the light and/or increase of the illuminated area.

A still further object of the present invention resides in a stop-light system of the type described above which not only gives a type or pre-warning to a driver to the rear of the vehicle in question but additionally results in a simple construction and is reliable in operation.

These and further objects, features and advantages of the present invention will become more obvious from the following description when taken in connection with the accompanying drawing which shows, for purposes of illustration only, two embodiments in accordance with the present invention, and wherein, FIG. 1 is a schematic view of a first embodiment of a stop-light circuit connection in accordance with the present invention.

Figure 1:
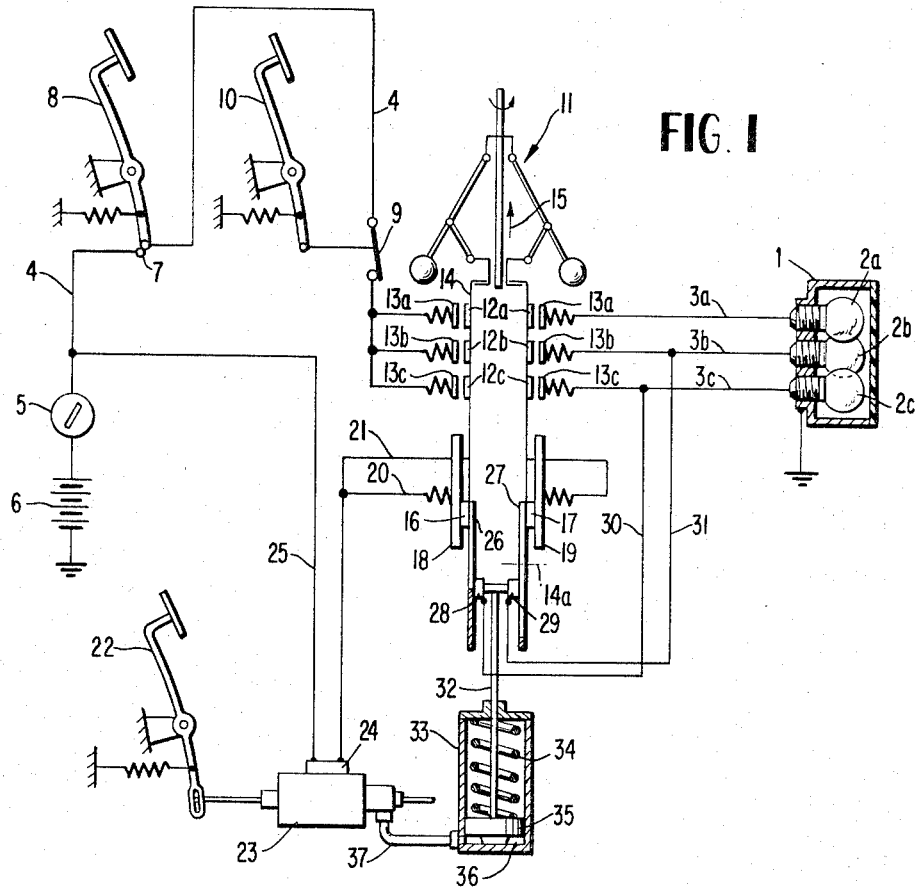

Referring now to the drawing wherein like reference numerals are used throughout the various views to designate like parts, and more particularly to FIG. 1, three incandescent lamps 2a, 2b and 2c are provided in the stop-light 1 conventionally arranged in a motor vehicle, which are connected each by itself with the line 4 by way of a respective one of the lines 3a, 3b and 3c; the line 4 is connected by way of the ignition switch 5 with the battery 6. The switch 7 which is interconnected in the line 4, is closed when the drive or gas pedal 8 is in the start position. Furthermore, the switch 9 is arranged in line 4 which is closed with a non-actuated clutch pedal 10.

The centrifugal switch generally designated by reference numeral 11 is connected into the lines 3a, 3b and 3c which with a stopped or standing-still vehicle connects with each other by means of its contacts 12a, the contacts 13a in line 3a, with its contacts 12b the contacts 13b in line 3b and with its contacts 12c the contacts 13c in the line 3c. The contacts 12a, 12b and 12c are arranged at the sleeve 14 which is pulled up in the direction of arrow 15 with an increasing driving velocity of the vehicle.

The contacts 16 and 17 are additionally arranged at the sleeve 14 below the contacts 13c which are connected by way of the contacts 18 and 19 and the lines 20 and 21 with the brake contact switch 24 of any conventional construction that is mounted at a conventional brake device 23 adapted to be hydraulically actuated by means of the brake pedal 22. The brake contact switch 24 is connected with the line 4 by way of the line 25.

The contacts 16 and 17 at the sleeve 14 are connected with the contacts 26 and 27 arranged on the inside of the sleeve 14. The contacts 28 and 29 are arranged between the contacts 26 and 27 or between their insulated extensions in the downward direction. The line 30 leads from contact 28 to the line 3c and the line 31 leads from the contact 29 to the line 3b. The contacts 28 and 29 are mounted at the end of the piston rod 32, which is connected with the piston 35 arranged in the cylinder 33 and is acted upon by the spring 34. The space 36 in the cylinder 33 is in communication with the brake device 23 by way of the pressure line 37 in such a manner that the contacts 28 and 29 are displaced into the sleeve 14 with an increasing brake pressure.

With a standing-still vehicle and turned-on ignition switch 5, current flows by way of the line 4 and the lines 3a, 3b and 3c, to the three incandescent lamps 2a, 2b and 2c, which are thus lighted up and indicate impressively that the vehicle is standing still. The incandescent lamps 2a, 2b and 2c are extinguished as soon as the vehicle is set into motion, in that for the shifting of a transmission ratio, the clutch pedal 10 is depressed and the switch 9 is opened or in that with motor vehicles having automatic transmissions, the switch 7 is opened by a movement of the drive pedal 8.

Figure 2:
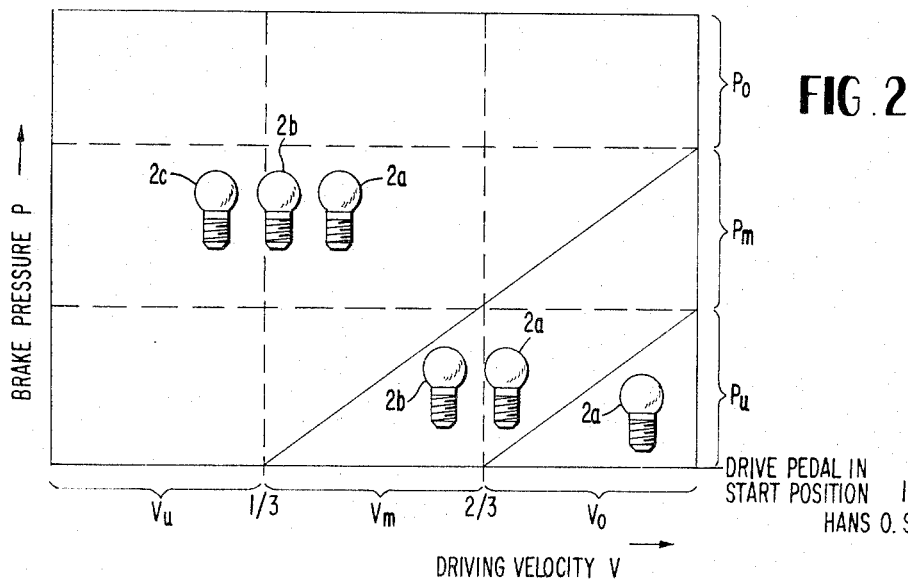
FIG. 2 is a diagram indicating the operation of the stop-light system of FIG. 1 in which brake pressure P is indicated along the ordinate and the driving velocity V along the abscissa.

As can be seen in particular in connection with FIG. 2, the entire velocity range of the vehicle is sub-divided into three steps and the arrangement is thereby made in such a manner that with a position of the drive pedal 8 in the starting position with a closed switch 7 in the lower velocity range $V_u$, all three incandescent lamps 2a, 2b and 2c light up, whereas in the middle velocity range $V_m$, only the two incandescent lamps 2a and 2b light up, and in the upper velocity range $V_o$, only the one incandescent lamp 2a lights up. While the vehicle moves in the lower velocity range $V_u$ with a non-actuated drive pedal 8, the contacts 12a, 12b and 12c make electric contact with the contacts 13a, 13b and 13c. In the middle velocity range $V_m$, only the contact 12b makes an electrical contact with the contact 13a and the contact 12c with the contact 13b. In the upper velocity range $V_o$, the contact 12c has a connection with the contact 13a.

As can be further seen in FIGS. 1 and 2, the arrangement is made in such a manner that the step-wise increase of the light intensity of the stop-light, represented by the numbers of lighting-up incandescent lamps is additionally influenced by the brake pressure P in the brake device 23, and more particularly in such a manner that the brake pressure necessary for shifting from one intensity step to the next higher intensity step depends linearly on the driving velocity. If the vehicle moves, for example in the velocity range $V_o$, then the lower edge of the sleeve 14 has been displaced into the position of 14a indicated in dash lines. If the drive pedal 8 is released prior to the depressing of the brake pedal 22, then only the incandescent lamp 2a lights up. If the brake mechanism 23 is then actuated by means of the brake pedal 22, then initially within a lower pressure range $P_u$, only the incandescent lamp 2a remains energized. Only when the brake pressure P has become so large that the contacts 28 and 29 have been displaced into the sleeve 14 by means of the piston 35 and the piston rod 32 to such an extent that the contact 29 makes electrical connection with the contact 19 by way of the contacts 27 and 17, additionally the incandescent lamp 2b lights up in the middle pressure range $P_m$ in addition to the incandescent lamp 2a. With a still higher brake pressure in the pressure range $P_o$, the incandescent lamp 2c then also additionally lights up because the contact 28 has been displaced into the sleeve 14 to such an extent that a connection to the line 20 is established by way of the contacts 26, 16 and 18, on the one hand, and an electrical connection to the line 3c and therewith to the incandescent lamp 2c is established, on the other, by line 30.

If the vehicle is braked from the middle velocity range $V_m$ then the two incandescent lamps 2a and 2b light up from the beginning upon taking back the drive pedal 8. These two incandescent lamps 2a and 2b further remain energized during the braking until with higher brake pressure or with the same or with little increasing brake pressure, when the vehicle is so decelerated that the driving velocity passes over from the velocity range $V_m$ into the velocity range $V_u$, the incandescent lamp 2c is additionally energized. With a brake operation in the lower velocity range $V_u$, all three incandescent lamps 2a, 2b and 2c continue to remain engergized always in the same manner.

Figure 3:
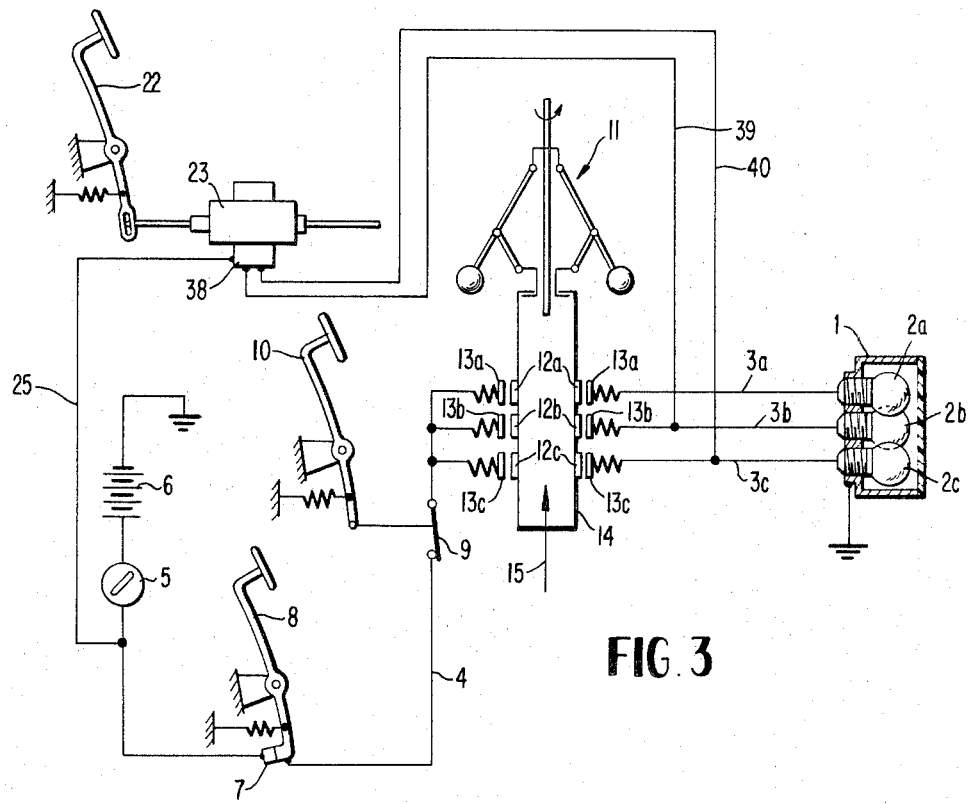
FIG. 3 is a schematic view of a second embodiment of a circuit for a stop-light system in accordance with the present invention.

The same reference numerals are used with the same parts in the embodiment of FIG. 3 which is somewhat simpler than the embodiment of FIG. 1. In order to achieve an illumination or lighting-up characteristic according to the diagram of FIG. 4 there are used in the place of the parts 16 to 21, 24 and 26 to 37 of the embodiment according to FIG. 1 the stepped pressure switch 38 at the brake device 23 and the two lines 39 and 40. The line 39 leads to the line 3b and the line 40 leads to the line 3c, in each case between the stop light 1 and the centrifugal switch 11.

Figure 4:
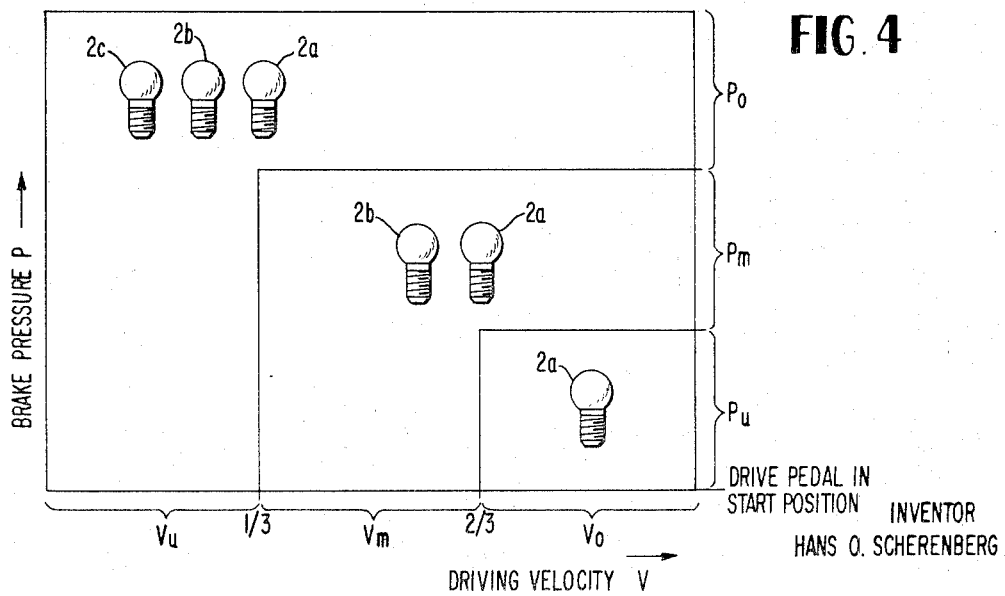
FIG. 4 is a diagram, similar to FIG. 2, of the operation of the stop-light system of FIG. 3.

The operation of the stop-light system of FIGS. 3 and 4 is as follows:

With a non-actuated drive pedal 8 and with the drive of the vehicle in the lower velocity range $V_u$ as can be seen from FIG. 4, the contacts 12a, 12b and 12c make electrical connection with the contacts 13a, 13b and 13c. All three incandescent lamps 2a, 2b and 2c light up. In the next higher velocity range $V_m$, the contacts 12b and 12c are electrically connected with the contacts 13a and 13b. Only the incandescent lamps 2a and 2b then light up. In the upper velocity range $V_o$, only the contact 12c establishes still an electrical connection with the contact 13a, and therefore only the incandescent lamp 2a lights up. If in this driving condition the brake pedal 22 is depressed, then the incandescent lamp 2a remains energized in the lower pressure range $P_u$. If the brake pressure reaches the middle brake pressure range $P_m$, then the incandescent lamp 2b is additionally energized by way of the stepped pressure switch 38 and the line 39. The incandescent lamp 2b is also additionally energized if the brake pressure does not increase or essentially does not increase whereas a deceleration of the vehicle takes place so that a switching operation takes place by means of the centrifugal switch 11 from the velocity range $V_o$ to the velocity range $V_m$. In the upper pressure range $P_o$, the third incandescent lamp 2c is additionally energized by way of the stepped pressure switch 38 and the line 40. During braking from the middle velocity range $V_m$, at first the incandescent lamps 2a and 2b remain energized and in the upper pressure range $P_o$, the incandescent lamp 2c is additionally energized. During the initiation of a braking operation from the lower velocity range $V_u$, all three incandescent lamps 2a, 2b and 2c remain always energized.

A very meaningful and extraordinarily effective warning is achieved by the dependence on the driving velocity and on the brake pressure. It can be readily determined from the type of illumination of the stop lights what length of brake path has to be reckoned with.

While I have shown and described only two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A stop-light system for motor vehicles having an accelerator pedal comprising velocity means for providing an output indicative of the driving velocity of the vehicle, brake pressure means for providing an output indicative of brake pressure applied for braking of the vehicle, lamp means for the stop-light system including a plurality of lamps adapted to be energized to provide a variable light indication to an operator of a trailing vehicle, energizing circuit means for energizing said lamp means, and switch means operatively connected in said energizing circuit means for controlling the energization of said lamp means, said switch means being responsive to the velocity means and the condition of the accelerator pedal for controlling the energization of the lamp means to provide a variable light indication which increases from a weak to a strong indication with decreasing driving velocity and a nonactuated condition of the accelerator pedal, said switch means being further responsive to the brake pressure means for controlling the energization of the lamp means to provide a variable light indication which increases from a weak to a strong indication with increasing brake pressure.

2. A stop-light system according to claim 1, wherein the change of the light indication is produced by a change in the illuminated surface.

3. A stop-light system according to claim 1, wherein the change in the light indication is produced by a change in the light intensity.

4. A stop-light system according to claim 1, in which with a decreasing driving velocity, the increase in the size of at least one of the illuminated surface and of the light intensity of the lamp means takes place step-wise.

5. A stop-light system according to claim 1, wherein said switch means provide a step-wise increase of one of the size of the illuminated surface and of the light intensity with an increase in the brake pressure.

6. A stop-light system according to claim 5, wherein the brake pressure necessary for switching from a step represented by a pre-determined illuminated surface or intensity to the next higher step depends linearly on the driving velocity.

7. A stop-light system according to claim 1, wherein said switch means include a plurality of switch energizing positions for providing a step-wise increase of one of the size of the illuminated surface and of the light intensity of the lamp means with an increase in the brake pressure.

8. A stop-light system according to claim 7, wherein the brake pressure necessary for switching from a step represented by a pre-determined illuminated surface or intensity to the next higher step depends linearly on the driving velocity.

9. A stop-light system according to claim 1, wherein said energizing circuit means includes first and second parallel electrical circuit paths for energizing said lamp means, said switch means including switch means responsive to said velocity means in the form of a centrifugal operated switch means arranged in said first circuit path and switch means responsive to said brake pressure means arranged in said second circuit path.

10. A stop-light system according to claim 9, wherein said switch means includes a first switch in said first path operatively connected with said accelerator pedal in such a manner that the first switch is closed when the accelerator pedal is in the normal start position.

11. A stop-light system according to claim 9, wherein said first circuit path includes several parallel branch circuits each connected to a respective lamp, said centrifugally operated switch means including contact means for each branch circuit, the number of branch circuits closed by said contact means decreasing with an increase in the driving velocity of the vehicle.

12. A stop-light system according to claim 11, wherein said brake pressure means provides an output indicative of brake-fluid pressure and said brake-pressure responsive switch means includes several contact means connected in further branch circuits connected with respective first-mentioned branch circuits in such a manner that the number of branch circuits closed by the contact means of said brake-pressure responsive switch means increases with an increase in the brake-fluid pressure.

13. A stop-light system according to claim 12, wherein said switch means includes a first switch in said first path operatively connected with said accelerator pedal in such a manner that the first switch is closed when the accelerator pedal is in the normal start position.

14. A stop-light system according to claim 13, wherein said first switch and said centrifugally operated switch means are series-connected.

15. A stop-light system for motor vehicles comprising velocity means for providing an output indicative of the driving velocity of the vehicle, brake pressure means for providing an output indicative of brake pressure applied for braking of the vehicle, lamp means for the stop-light system adapted to be energized to provide a variable light indication to an operator of a trailing vehicle, energizing circuit means for energizing said lamp means, and switch means operatively connected in said energizing circuit means for controlling the variable light indication of said lamp means, said switch means being responsive to said velocity means and said brake pressure means for controlling the energization of said lamp means to provide a variable light indication, said switch means including an accelerator pedal having a switch connected thereto for controlling the energizing of the lamp means in the position of the accelerator pedal corresponding to the normal starting position, clutch means and a manually shifted transmission in the drive connection of the vehicle, a first switching means operatively connected with said clutch means for disabling the signal from said velocity means upon actuation of the clutch means, said switch means controlling said energizing circuit means for providing a stepwise increase of one of the size of the illuminated surface and of the light intensity of the lamp means in accordance with a decreasing driving velocity and increasing braking pressure, the brake pressure necessary for switching from a predetermined illuminated surface or intensity step to the next higher step being linearly dependent on the driving velocity.

16. A stop-light system according to claim 15, wherein said switch means includes a second switching means in the energizing circuit to the lamp means, said second switching means being responsive to said velocity means for controlling the energizing of said lamp means with a nonactuated accelerator pedal to provide a step-wise increase of one of the illuminated surface and of the light intensity with decreasing driving velocity.

17. A stop-light system according to claim 16, wherein said second switching means is a centrifugal switch means.

18. A stop-light system according to claim 16, wherein said switch means includes third switching means responsive to the brake means for controlling the energizing of said lamp means to provide a stepwise increase of the illuminated surface or light intensity of said lamp means with increasing brake pressure.

19. A stop-light system according to claim 16, wherein said switch means includes third switching means responsive to said brake means for controlling the energizing of said lamp means in accordance with different brake pressures.

20. A stop-light system for motor vehicles having an accelerator pedal and a clutch pedal comprising velocity means for providing an output indicative of the driving velocity of the vehicle, brake pressure means for providing an output indicative of brake pressure applied for braking of the vehicle, lamp means for the stop-light system adapted to be energized to provide a variable light indication to an operator of a trailing vehicle, energizing circuit means for energizing said lamp means, and switch means operatively connected in said energizing circuit means for controlling the variable light indication of said lamp means, said switch means being responsive to said velocity means and said brake pressure means for controlling the energization of said lamp means to provide a variable light indication which increases from a weak to a strong indication with decreasing driving velocity and with an increasing brake pressure, said switch means includes centrifugally operated switch means operated in dependence on the output of the driving velocity means of the vehicle, a first switch operatively connected with said accelerator pedal in such a manner that the first switch is closed when the accelerator pedal is in the normal start position, and a second switch operatively connected with said clutch pedal in such a manner that said second switch is opened with said clutch pedal actuated.

21. A stop-light system according to claim 20, wherein said brake pressure means provides an output indicative of brake-fluid pressure and said switch means includes a brake-fluid responsive switch means connected in said energizing circuit means in parallel with said centrifugally operated switch means.

22. A stop-light system according to claim 21, wherein said energizing circuit means includes several parallel branch circuits each connected to a respective lamp means, said centrifugally operated switch means including contact means for each branch circuit, the number of branch circuits closed by said contact means decreasing with an increase in the driving velocity of the vehicle.

23. A stop-light system according to claim 22, wherein said first and second switches as well as said centrifugally operated switch means are series-connected.

24. A stop-light system according to claim 23, wherein said brake-fluid responsive switch means includes several contact means connected in further branch circuits connected with respective first-mentioned branch circuits in such a manner that the number of branch circuits closed by the contact means of said brake-fluid responsive switch means increases with an increase in the brake-fluid pressure.

* * * * *